United States Patent [19]
Rhyner et al.

[11] 4,090,961
[45] May 23, 1978

[54] PROCESS AND APPARATUS FOR MONITORING THE ELECTRICAL DISCHARGE EFFICIENCY OF AN EDM MACHINE

[75] Inventors: Heinz Rhyner; Francois Balleys; Georges-André Marendaz, all of Geneva, Switzerland

[73] Assignee: Ateliers des Charmilles S.A., Geneva, Switzerland

[21] Appl. No.: 670,053

[22] Filed: Mar. 24, 1976

[30] Foreign Application Priority Data

Apr. 11, 1975 Switzerland ..................... 4634/75

[51] Int. Cl.² ........................................... B23P 1/08
[52] U.S. Cl. ............................... 219/69 C; 219/69 M
[58] Field of Search ................. 219/69 M, 69 C, 69 G

[56] References Cited

U.S. PATENT DOCUMENTS

| 3,474,216 | 10/1969 | Morgan | 219/69 G |
| 3,694,599 | 9/1977 | Davis | 219/69 C |
| 3,816,692 | 6/1974 | Ratmansky | 219/69 C |
| 3,864,541 | 2/1975 | Inoue | 219/69 C |
| 3,875,374 | 4/1975 | Inoue | 219/69 C |
| 3,943,321 | 3/1976 | Pfau et at | 219/69 M |

*Primary Examiner*—Bruce A. Reynolds
*Attorney, Agent, or Firm*—Hauke & Patalidis

[57] ABSTRACT

A process and apparatus for monitoring the efficiency of an EDM machine by providing an electrical magnitude or signal representing the current flow actually used for machining or, in the alternative, the actual material removal rate. Several circuits are disclosed permitting to provide the operator of an EDM machine with a visual display of the practical efficiency of the machine during a machining operation.

6 Claims, 5 Drawing Figures

PROCESS AND APPARATUS FOR MONITORING THE ELECTRICAL DISCHARGE EFFICIENCY OF AN EDM MACHINE

BACKGROUND OF THE INVENTION

The present invention relates to a process and apparatus for providing monitoring of the efficiency of operation of an EDM machine by way of a visual display of a measured electrical magnitude proportional to the current flow at the machining gap accomplishing useful work or, in the alternative, providing an analog indication of the actual material removal rate in the course of a machining operation.

It is known in EDM technology to provide an indication of machining efficiency by measuring magnitudes representative of the duration of the electrical discharges at the gap between an electrode tool and an electrode workpiece, or the current or voltage level of the electrical discharges. For example, U.S. Pat. No. 3,474,216 discloses a circuit for comparing the number of useful electrical discharges to a predetermined number of successive electrical discharges applied to an EDM machining gap, and for providing a magnitude representative of the ratio of those two numbers. The ratio represents the rate of useful electrical discharges or, in other words, the quality of the electrical discharges, but it does not provide any indication with respect to the useful machining current or the real machining rate, because the ratio does not take into consideration the density of the electrical discharges during the time interval during which they are counted.

Another circuit, disclosed in U.S. Pat. No. 3,816,692, determines the product of the pulse rate at the gap during a predetermined time interval by the current rate through the gap during the same time interval and supplies a digital display of the product. Such a circuit permits to obtain some indications of the electrical discharge rate, but it does not permit to appraise the useful machining current because it takes into consideration both the machining discharges and the non-machining discharges such as arcing and short-circuits, the frequency of the non-machining discharges having a non-negligible influence upon the useful current and the machining efficiency. Another portion of the disclosed circuit provides a visual display of the number of abnormal discharges taking place during a predetermined machining time interval. The machine operator is not able to derive from the two informations thus provided the real value of the useful machining current.

The present invention has for an object to remedy the shortcomings and inconveniences of those prior art circuits by supplying to the machine operator a continuous information display of the useful machining current.

SUMMARY OF THE INVENTION

The process and apparatus of the present invention provides means for detecting the machining electrical discharges in an EDM apparatus and for deriving an electrical magnitude of an amplitude proportional to the duration of all the machining discharges within a predetermined machining time interval. Such an arrangement presents many advantages, because it permits to utilize the electrical magnitude thus derived as a value which may be optimized by means of automatic adjustment of the machining parameters, such as to constantly maintain a maximized material removal rate. By multiplying this magnitude by the theoretical quantity of material removed by unit of time and current, such theoretical quantity being well known in electrical discharge machining technology, the machine operator is thus supplied with an information corresponding to the real material removal rate.

BRIEF DESCRIPTION OF THE DRAWINGS

The many advantages of the present invention will become apparent to those skilled in the art when the following description of some of the best modes contemplated for practicing the invention is read in conjunction with the accompanying drawing representing for illustrative purpose a schematic block diagram and modifications thereof according to the present invention, wherein.

DETAILED DESCRIPTION OF THE PREFERRED EMBODIMENTS

Figure 1:
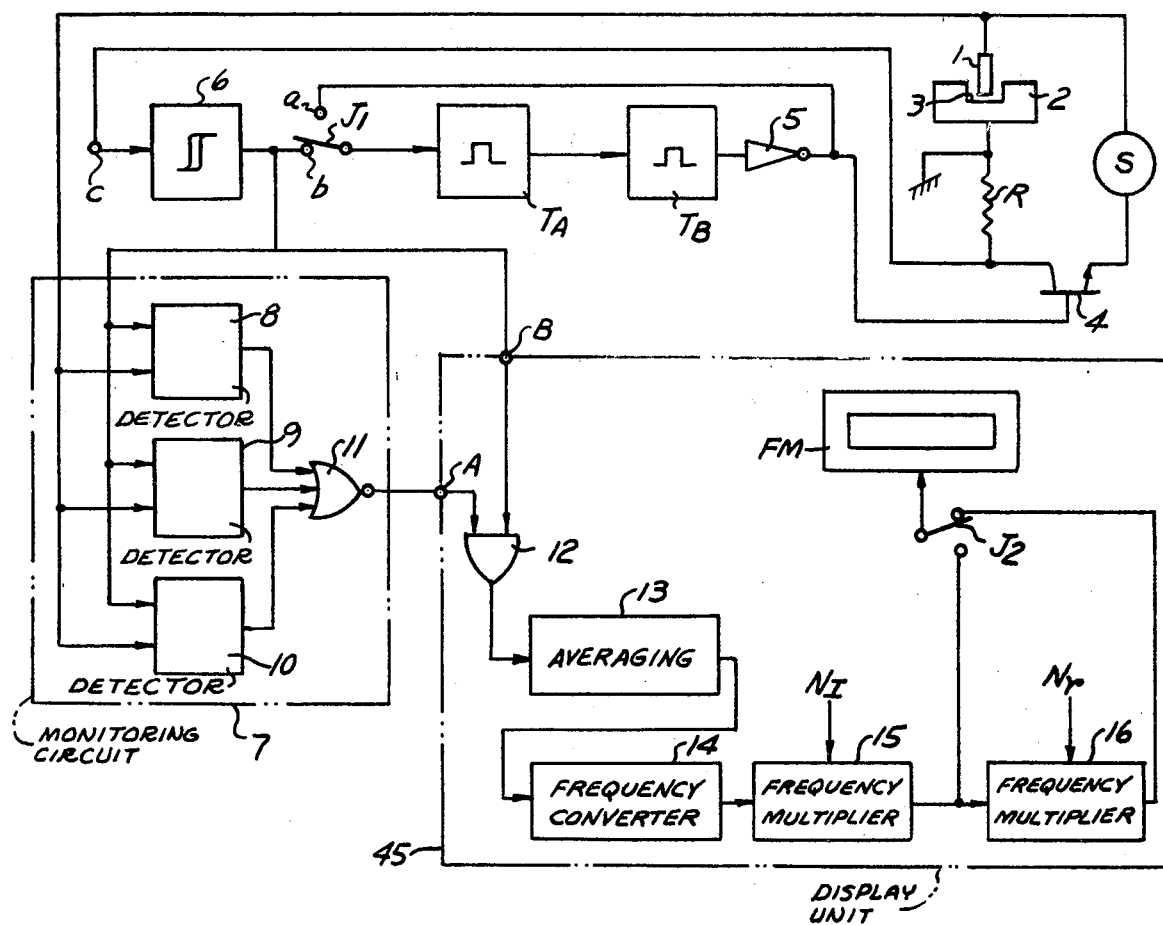
FIG. 1 is a schematic block diagram of a circuit according to the present invention.

With reference to FIG. 1 of the drawing, there is illustrated a circuit diagram comprising an electrode tool 1 for machining a current conductive workpiece 2 by means of electrical discharges occurring in a machining zone 3 generally filled by a dielectric coolant. The electrical discharges at the machining zone or gap 3 between the electrode tool 1 and the workpiece 2 are obtained from a source S connected in series with an electronic power switch 4, schematically represented by a transistor, and with a resistor R permitting to develop a voltage thereacross each time an electric pule is flowing in the circuit.

The voltage across the resistor R is applied to the input of a Schmitt trigger 6 whose output is connected to the input of a monostable multivibrator $T_A$ controlling in turn a second monostable multivibrator $T_B$ whose output through an inverter 5 controls the electronic switch 4. Such a circuit permits to obtain electrical discharges of constant duration independently of the random delay time intervals occurring between the moment at which the voltage of the source S is applied across the gap 3 between the electrode tool 1 and the workpiece 2 and the moment at which a discharge current begins to flow. As soon as the discharge current appears, the voltage pulse appearing across the resistor R operates, after having been approximately shaped by the Schmitt trigger 6, on the monostable multivibrator $T_A$ whose instability time period determines in turn the duration of the discharge detected by means of the resistor R. When the monostable multivibrator $T_A$ returns to its stable state, this in turn changes the state of the monostable multivibrator $T_B$ whose duration of unstable state determines the duration of the interval between the end of a current pulse and the moment at which a new voltage pulse is applied across the electrode 1 and the workpiece 2.

A single-pole double throw (SPDT) switch $J_1$ is connected between the Schmitt trigger 6 and the monostable multivibrator $T_A$, having a movable contact which may be connected at will to a terminal a or b. The SPDT switch $J_1$ is normally connected with its movable contact in the position shown, that is connected to the terminal b. With the movable contact of the SPDT switch $J_1$ connected to the terminal a, the signals appearing at the output of the inverter 5 are applied to the input of the monostable multivibrator $T_A$, such that the pulse duration is independent of the moment at which the beginning of the current discharge occurs.

The circuit schematically illustrated at FIG. 1 comprises in addition a monitoring circuit 7 comprising three detectors 8, 9 and 10 to indicate respectively the presence or absence of short circuits, the presence or absence of arcing, and the degree of contamination of the dielectric coolant in the machining gap. Such detectors are well known and need not be described in detail (see for example, U.S. Pat. Nos. 3,739,136 and 3,739,137 and Swiss Pat. No. 529,609). Each detector has a first input to which is applied the instantaneous voltage at the electrode tool 1, and a second input to which is applied the signal at the output of the Schmitt trigger 6. By providing two inputs for each detector, it is possible to make the detectors active only during the duration of a current discharge pulse. The detectors 8-10 are of the memory type and continue to occupy a logic state determined by the last information received until a new bit of different information causes them to change their state. The signals at the output of the three detectors are applied to the three inputs of a NOR gate 11 having an output connected to a terminal A of a display unit 45 providing a visual display in the form of a magnitude proportional to the machining efficiency.

The terminal A of the display unit 45 is connected to one of the inputs of an AND gate 12, the other input of which is connected to a terminal B of the display unit to which is applied the signals at the output of the Schmitt trigger 6. The output signals of the AND gate 12 are applied to an averaging circuit 13 which provides an average value for the signals at the output of the AND gate 12. A signal is obtained at the output of the AND gate 12 each time an electrical discharge occurs in the machining zone 3 between the electrode tool 1 and the workpiece 2 simultaneously with no fault being detected by any one of the detectors 8, 9 or 10. In other words, each pulse at the output of the AND gate 12 indicates that an electrical discharge occurs during normal machining conditions, and such pulse has a duration equal to that of the electrical discharge. As soon as one of the detectors 8, 9 or 10 detects an abnormal condition, the output from the NOR gate 11 drops and inhibits the AND gate 12.

The averaging circuit 13 provides at its output an analog signal corresponding to the average value of the signals at the input of the averaging circuit. The analog signal at the output of the averaging circuit 13 is applied to a frequency converter 14 having an output providing a logic signal of a frequency proportional to the value, or amplitude, of its input signal. The output of the frequency converter 14 is connected to the input of a multiplier circuit 15 whose function it is to multiply the frequency of the signal by a number $N_1$, manually set by the machine operator, which is representative of the level of the electrical discharge current.

The output of the multiplier circuit 15 is connected to the input of a second multiplier circuit 16 whic accomplishes the function of multiplying the frequency of its input signal by a number $N_r$ representative of the theoretical material removal rate by unit of time and current. The value of the number $N_r$ is determined by the particular conditions of machining operation as a function of machining parameters established by the machine operator. It is evident that the input numbers $N_1$ and $N_r$ may be obtained automatically from a controller, not shown, holding in store appropriate data corresponding to preset machining parameters. A SPDT switch $J_2$ permits to apply to a frequency meter FM either the signal at the output of the multiplier circuit 15 or the signal at the output of the multiplier circuit 16. When the signal at the output of the multiplier circuit 15 is applied to the frequency meter FM, the value indicated by the pointer of the meter corresponds to a magnitude which is characteristic of the useful machining current. However, if the frequency meter FM is connected to the signal appearing at the output of the multiplier circuit 16, the frequency meter pointer is displaced to indicate an electrical magnitude which corresponds to a characteristic value of the real material removal rate, i.e., the quantity of material removal by unit of time.

It will be appreciated that in this embodiment of the invention, if the SPDT switch $J_1$ has been omitted, such switch $J_1$ permitting to provide each voltage pulse with a predetermined duration independently of the electrical discharge duration, the terminal B of the display unit 45 may be connected to the output of the monostable multivibrator $T_A$ as well as to the output of the Schmitt trigger 6.

Figure 2:
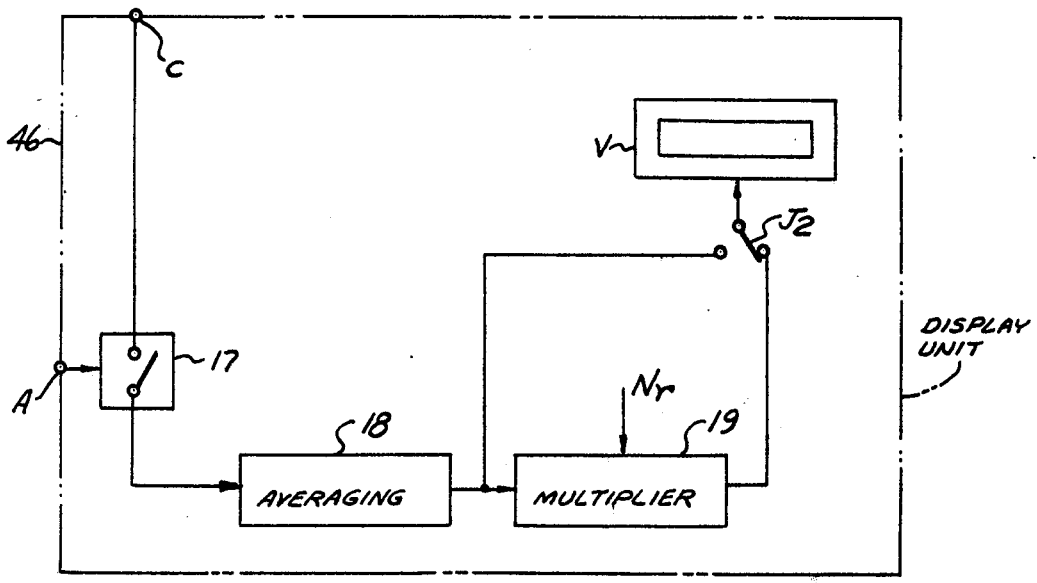
FIGS. 2–5 are schematic block diagrams of modifications of the circuit of FIG. 1.

FIG. 2 illustrates a modification of the display unit 45 of FIG. 1. This modification is designated in FIG. 2 by the numeral 46, and it comprises a relay switch 17, which can be in the form of an electronic switch comprising, for example, field effect transistors. The circuit controlled by the relay switch 17 is connected, by means of a terminal C, to the common point C at the input of the Schmitt trigger 6 of FIG. 1. Consequently, the voltage amplitude signal appearing across the resistor R of FIG. 1 appears at the terminal C of the display unit circuit 46 such that, as long as the relay switch 17 is closed, there appears at the output of the switch pulses corresponding to the discharge pulses appearing across the machining zone 3 between the electrode tool 1 and the workpiece 2. Those pulses appear at the output of the relay switch 17 as long as the three detectors 8, 9 and 10 are monitoring normal machining conditions, and they are applied to an averaging circuit 18 converting to an average value the signals proportional to the amplitude of the discharge current. As long as the detectors 8-10 monitor normal machining conditions, the relay switch 17 is held closed by the voltage at the output of the NOR gate 11 of FIG. 1 being applied to the terminal A of the display unit circuit 46 of FIG. 2 connected to the controlling element of the relay switch 17.

The output of the averaging circuit 18 is connected to the input of a multiplier circuit 19 which multiplies the analog signal appearing at the output of the averaging circuit 18 by an electrical magnitude $N_r$ representative of the theoretical material removal rate by unit of time and current.

A SPDT switch $J_2$ permits to apply either the signal at the output of the averaging circuit 18 or the signal at the output of the multiplier circuit 19 to a voltmeter V which thus displays a magnitude corresponding to the useful machining current or to the real machining rate, according to the position of the movable contact of the switch $J_2$.

If abnormal conditions are detected by the detectors 8, 9 or 10, the output of the NOR gate of FIG. 1, being connected to the terminal A of FIG. 2, operates the relay switch 17 such as to open the switch, with the result that the voltmeter V displays a zero value.

Figure 3:
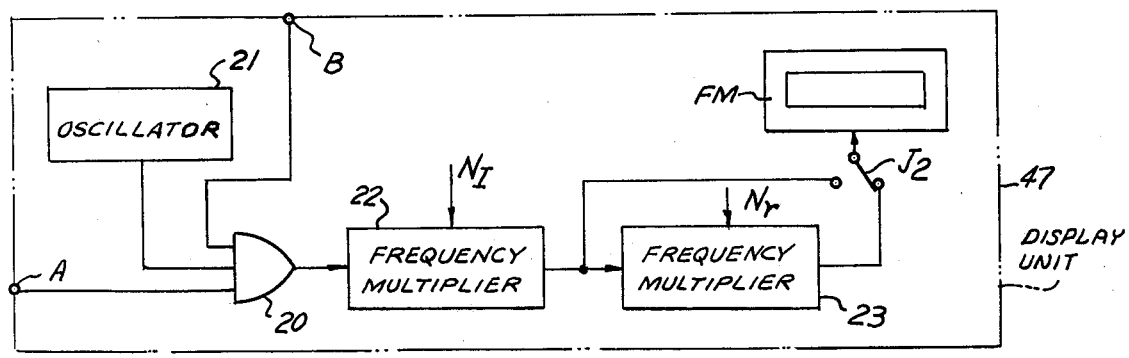

FIG. 3 illustrates a second modification of the display portion of the circuit of the invention now designated by reference numeral 47. In this modification, the AND gate 12 of FIG. 1 is replaced by an AND gate 20 having three inputs, the third input being connected to an oscillator 21 providing pulses of a predetermined frequency. The frequency at the output of the oscillator 21 is much higher than the electrical discharge frequency. In this manner, at the output of the AND gate 20 there is provided a high frequency pulse train during each machining electrical discharge, as long as the machining conditions are normal.

The signals at the output of the AND gate 20 are applied to a frequency multiplier circuit 22 which transforms the pulse frequency of the pulse trains into another frequency proportional to the number $N_I$ representative of the level of the electrical discharge current. The frequency multiplier circuit 22 is connected to the input of a frequency multiplier circuit 23 which permits to multiply the frequency at its input by the number $N_r$, as defined hereinbefore. A frequency meter FM, whose principle of operation is based upon counting the number of pulses occurring during a predetermined time interval much longer than the discharge period, may be connected at will by means of the SPDT switch $J_2$ to the output of the multiplier circuit 22 or to the output of the multiplier circuit 23, according to whether it is desired that the frequency meter FM display a value which is characteristic of the useful machining current or of the real material removal rate.

Figure 4:
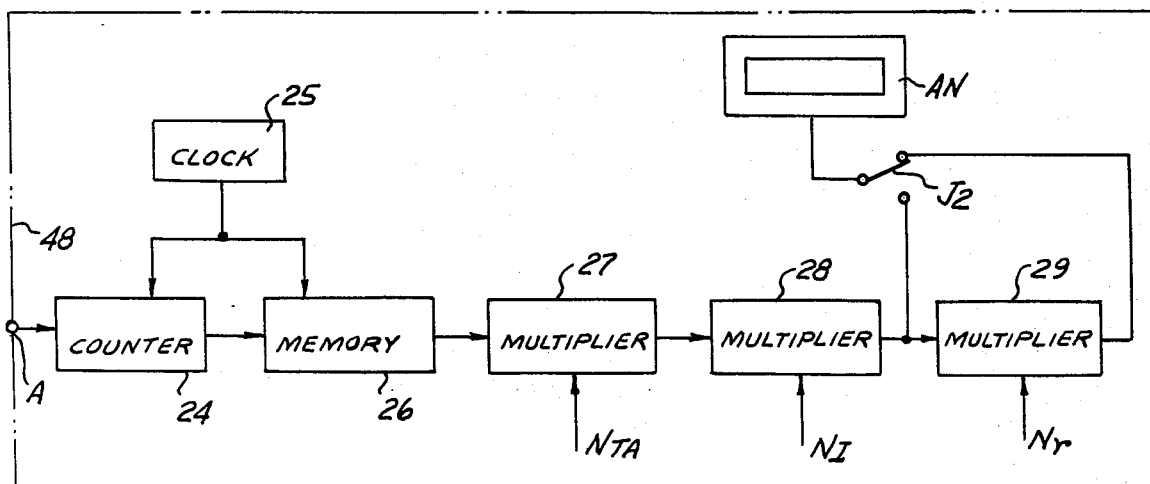

FIG. 4 illustrates a further modification of the display portion of the circuit of the invention, this time designated by numeral 48, and which is for use in an EDM machine wherein the output of the Schmitt trigger 6 of FIG. 1 is always connected to the input of the monostable multivibrator $T_A$, such a machine being therefore not provided with the SPDT switch $J_1$ shown at FIG. 1. With such an arrangement, the monostable multivibrator $T_A$ strictly controls the duration of each machining electrical discharge. In addition, it is sufficient if the monitoring portion of the circuit supplies at its output a pulse, of any duration, for each machining pulse occurring under normal conditions, that is, for each electrical discharge effecting removal of material from the workpiece by electro-erosion.

The display circuit 48 of FIG. 4 comprises a counter 24 having its input connected to the terminal A which accepts the pulses at the output of the monitoring circuit 7 of FIG. 1. A clock 25 determines the time interval during which the counter 24 upcounts the pulses appearing at its input. The clock 25 also controls a memory 26 which stores the number of pulses occurring during the interval of time determined by the pulses at the output of the clock 25.

The output of the memory 26 is connected to the input of a binary multiplier circuit 27 whose function it is to multiply the number provided at the output of the memory 26 by a number $N_{TA}$ which is provided at another input of the circuit 27 and which is representative of the duration of each discharge, as determined by the monostable multivibrator $T_A$ of FIG. 1. Two other binary multiplier circuits 28 and 29 are connected in series at the output of the multiplier circuit 27 and permit to multiply the signal of their input respectively by the number $N_I$ representative of the level of the discharge current and by the number $N_r$, as previously indicated relative to the circuits 15 and 16 of FIG. 1.

A digital display AN is provided for supplying a numerical display of the number obtained either by the binary multiplier circuit 28, or by the binary multiplier circuit 29, according to the position of the SPDT switch $J_2$.

Figure 5:
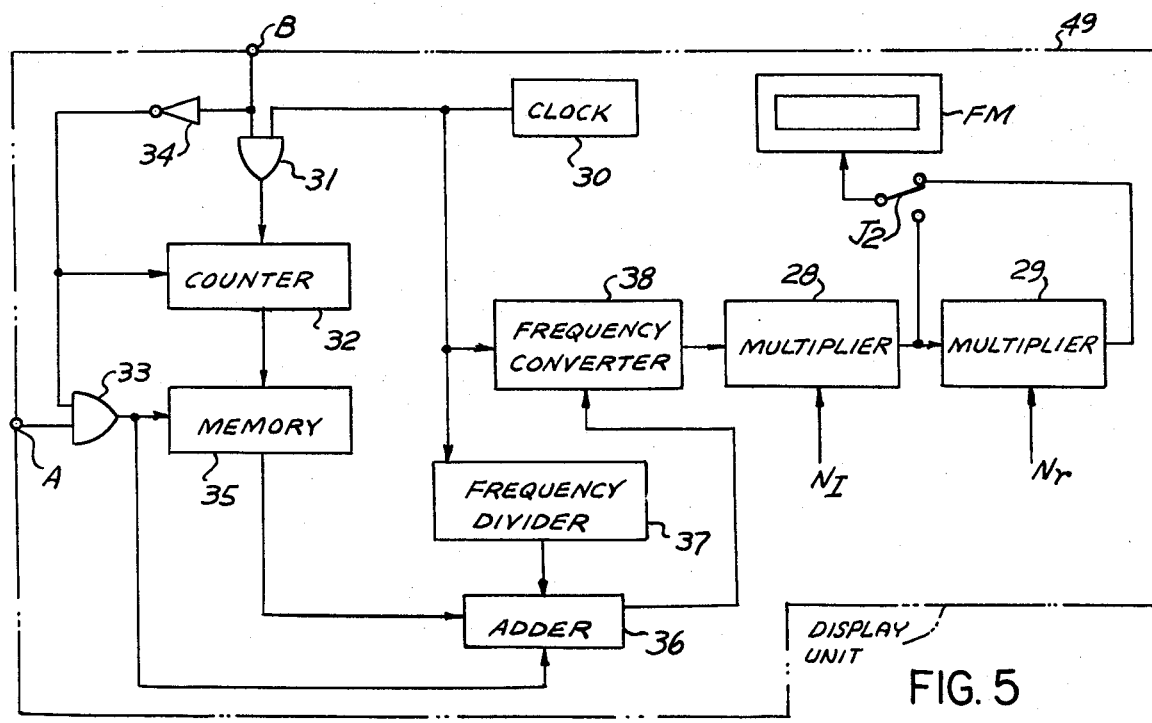

FIG. 5 illustrates a further modification of the display portion, designated by numeral 49, which is an improvement of that illustrated at FIG. 4, for supplying a visual display of the machining efficiency for the two alternative possible operations of the machining pulse generator of FIG. 1. Those two alternative possibilities result from triggering the monostable multivibrator $T_A$ either by means of the signals at the output of the Schmitt trigger 6, which provides a machining by way of constant duration discharges, or by means of the signals applied to the switch transistor 4, which provides constant duration voltage pulses, the duration of current flow being in the latter mode variable and equal to the duration of the voltage pulses decreased by the random delay time interval.

In the representation of FIG. 5, the multiplier circuits 28 and 29 of FIG. 4 and the visual display are repeated. In order to introduce into the multiplier circuit 28 a signal corresponding to that provided by the multiplier circuit 27 of FIG. 4, the modification of FIG. 5 further comprises additional elements designated by reference numerals 30 through 38 and forming part of the display circuit 49.

A clock 30 provides output pulses, at a frequency much higher than that of the machining electrical discharges, which are applied to one of the inputs of an AND gate 31. The other input of the AND gate 31 is connected to the terminal B, such that during the occurrence of each machining discharge, a pulse train is obtained at the output of the AND gate 31, the frequency of the pulse train being determined by the clock 30 and the duration of the pulse train being equal to that of the electrical discharge. Those pulse trains are applied to a counter 32 which is reset to zero at the end of each machining discharge by means of an inverter 34. The display circuit 49 also comprises an AND gate 33 having a first input connected to the terminal A in order to establish whether the machining conditions are normal, and having a second input which is connected to the terminal B through the inverter 34. In this manner, there is obtained at the output of the AND gate 33 a positive signal during each time interval between two consecutive machining discharges, only when this time interval is preceded by a material removing, or electroeroding, discharge.

The number of pulses counted in each pulse train by the counter 32 is supplied after each machining discharge to a memory 35 which is controlled by the output of the AND gate 33 for supplying to an adder circuit 36 the information stored in the memory and for simultaneously accepting a new store from the counter 32. The adder 36 adds the numbers stored in the memory 35 during a time interval determined by the output signal of a frequency divider 37 accepting the pulses from the clock 30. A frequency multiplier circuit 38 converts the frequency at the output of the clock 30 into a signal of a frequency proportional to the number appearing at the output of the adder 36. The signal at the output of the circuit 38 is multiplied in the multiplier circuits 28 and 29 as previously described, and is then applied to the frequency meter FM.

It will be appreciated that many modifications of the described circuits are contemplated by the present invention. In the circuits given for illustrative purpose, the durations of the electro-erosive discharges have been described as being added, but it will be readily apparent that the same results will be achieved by adding the durations of the non-machining pulses. By using such alternative means, it will be necessary to establish a reference signal value representative, for each machining setting, of the theoretical maximum of machining efficiency. From that reference value is then subtracted a value proportional to the total duration of the non-machining discharges in order to obtain a signal representative of the real machining efficiency.

Although the present invention, as described, contemplates providing a visual display of a magnitude representative of the machining efficiency, it will be readily apparent that this electrical magnitude can also be used as a command signal for controlling a circuit supplying data for automatically modifying the machining conditions.

Having thus described the present invention by way of some of the best modes contemplated for practicing the invention, modifications whereof will be apparent to those skilled in the art, what is claimed as new is as follows:

1. Process for monitoring the machining efficiency of an EDM machine placing across a machining zone between an electrode tool and an electrode workpiece successive electrical discharges obtained by connecting and disconnecting across said machining zone at least one source of direct current, said process comprising detecting which ones of said electrical discharges are machining discharges, establishing an electrical signal of an amplitude proportional to the total durations of said machining discharges relative to a predetermined machining time interval, multiplying the value of said electrical signal by a second value representative of the current level of said discharges for obtaining a third value representative of the useful machining current, and multiplying the value of said electrical magnitude by the theoretical material removal rate by unit of time and current for providing a fourth value having an amplitude representative of the real material removal rate.

2. The process of claim 1 wherein the amplitude of said fourth value is visually displayed.

3. An apparatus for monitoring the machining efficiency of an EDM machine providing at the machining gap between an electrode tool and an electrode workpiece successive electrical discharges obtained by consecutively connecting and disconnecting thereacross at least one source of direct current, said apparatus comprising means for detecting whether an electrical discharge is electro-erosive, said means comprising means for establishing a logic signal each time there occurs an electro-erosive discharge, means for establishing an electrical signal of a value proportional to the frequency of said logic signal and to the average duration of said electro-erosive discharges, means for measuring the machining current during the duration of an electrical discharge only when said logic signal occurs, means for providing said electrical signal with a value proportional to the average value of the measured current, means for giving to said logic signal a value established during the duration of a discharge and no value between two consecutive discharges, and means for providing said electrical signal with a value proportional to the average value of said logic signal.

4. The apparatus of claim 3 further comprising means for providing said logic signal with a duration equal to that of the electro-erosive discharges, means for supplying reference pulses at a constant frequency larger than the frequency of said electrical discharges, and means for providing said electrical signal with a value proportional to the average frequency of said reference pulses provided during the duration of said logic signal.

5. The apparatus of claim 3 further comprising means for giving to each discharge a constant predetermined duration, means for counting the number of times said logic signal appears during a predetermined time interval, and means for providing said electrical signal with a value proportional to the product of said number of another representative of said electrical discharge duration.

6. The apparatus of claim 3 further comprising means for supplying a second electrical signal of a duration equal to the duration of an electrical discharge, means for supplying reference pulses at a constant frequency larger than the frequency of said electrical discharges, means for counting the number of said reference pulses provided during the duration of said second electrical signal, means for storing said number of reference pulses upon detecting said logic signal indicating the presence of an electro-erosive discharge, and means for providing said first mentioned electrical signal with a value proportional to a sum of a plurality of said number stored during a predetermined time interval.

* * * * *

UNITED STATES PATENT AND TRADEMARK OFFICE
CERTIFICATE OF CORRECTION

PATENT NO. : 4,090,961
DATED : May 23, 1978
INVENTOR(S) : Heinz Rhyner et al

It is certified that error appears in the above-identified patent and that said Letters Patent are hereby corrected as shown below:

Column 2, line 33, "pule" should be --pulse--;
line 48, "approximately" should be --appropriately--.

Column 3, line 58, "whic" should be --which--.

Column 5, line 62, "of" should be --at--.

Column 6, lines 46 and 47, correct hyphenation of "electro-eroding".

Column 8, line 31, "of" second occurrence, should be --by--.

Signed and Sealed this

Twenty-fourth Day of October 1978

[SEAL]

Attest:

RUTH C. MASON
Attesting Officer

DONALD W. BANNER
Commissioner of Patents and Trademarks